US012686030B2

(12) United States Patent
Nitta et al.

(10) Patent No.: US 12,686,030 B2
(45) Date of Patent: Jul. 21, 2026

(54) STRUCTURAL MEMBER AND METHOD FOR PRODUCING THE SAME

(71) Applicant: TOTO LTD., Fukuoka (JP)

(72) Inventors: Yasutaka Nitta, Fukuoka (JP); Tatsuya Koga, Fukuoka (JP)

(73) Assignee: TOTO LTD., Fukuoka (JP)

( * ) Notice: Subject to any disclaimer, the term of this patent is extended or adjusted under 35 U.S.C. 154(b) by 0 days.

(21) Appl. No.: 18/591,327

(22) Filed: Feb. 29, 2024

(65) Prior Publication Data

US 2024/0293841 A1 Sep. 5, 2024

(30) Foreign Application Priority Data

Mar. 3, 2023 (JP) ................................. 2023-032714

(51) Int. Cl.
*B05D 1/02* (2006.01)
*B05D 3/00* (2006.01)

(52) U.S. Cl.
CPC ............... *B05D 1/02* (2013.01); *B05D 3/007* (2013.01)

(58) Field of Classification Search
None
See application file for complete search history.

(56) References Cited

U.S. PATENT DOCUMENTS

2008/0276865 A1 11/2008 Nishimizu et al.
2014/0295144 A1* 10/2014 Ito .......................... C23C 24/04 428/172

FOREIGN PATENT DOCUMENTS

| | | | | |
|---|---|---|---|---|
| JP | 2008-160093 A | 7/2008 | | |
| KR | 10-2015-0015546 A | 2/2015 | | |
| KR | 10-2018-0129366 A | 12/2018 | | |
| KR | 20180129366 A * | 12/2018 | ........... | H01L 21/324 |

* cited by examiner

*Primary Examiner* — Michael P. Rodriguez
(74) *Attorney, Agent, or Firm* — Finnegan, Henderson, Farabow, Garrett & Dunner LLP

(57) ABSTRACT

A structural member 10 includes a base material 100 and a protective film 200 formed by depositing a material while applying an impact force to a surface 110 of the base material 100. Provided that an index indicating a degree of a local denseness of the protective film 200 is defined as a denseness index, the value of the denseness index at a first portion that is a portion of the protective film 200 including an outer surface 210 thereof is 50% or more of the value of the denseness index at a second portion that is a portion of the protective film 200 closer to a base material 100 side thereof than the first portion.

2 Claims, 3 Drawing Sheets

STRUCTURAL MEMBER AND METHOD FOR PRODUCING THE SAME

CROSS-REFERENCE TO RELATED APPLICATION

This application is based upon and claims the benefit of priority from Japanese Patent Application No. 2023-032714, filed on Mar. 3, 2023, the entire contents of which are incorporated herein by reference.

BACKGROUND OF THE INVENTION

Field of the Invention

The present invention relates to a structural member and a method for producing the same.

Description of the Related Art

Structural members having a protective film on a surface of a base material are used in various fields such as semiconductor manufacturing apparatus. For example, in a plasma etching apparatus, a protective film is formed on a surface of a base material constituting an inner wall of a chamber in order to protect the base material from plasma. As such a protective film, for example, an oxide ceramic such as yttria and a fluoride ceramic such as yttrium fluoride are used. The protective film is formed not only for the purpose of improving plasma resistance of the base material as described above, but also, for example, for aiming to improve wear resistance of the base material, and the like.

A method for forming a protective film on a surface of a base material can employ various deposition methods, such as PVD and CVD. In recent years, the deposition has been carried out by an aerosol deposition method, ion-assisted vapor deposition, and the like. Both of these deposition methods are deposition methods in which a protective film material is deposited on a surface of a base material by injecting or accelerating the protective film material toward the surface of the base material. As described in Japanese Patent Laid-Open No. 2008-160093, after a protective film is formed by the aerosol deposition method and the like, surface roughness of the protective film is adjusted by polishing and the like.

In deposition using the aerosol deposition method and the like described above, a material of a protective film is to be deposited while applying an impact force to a surface of a base material. The impact force accompanying the arrival of the material is applied not only to the surface of the base material, but also to the existing protective film that has already been formed.

Thanks to the repeated impact force applied after deposition, a portion of the protective film on a base material side thereof tends to become a film with a relatively high denseness. A surface portion of the protective film on the outermost surface side, on the other hand, tends to become a film with a relatively low denseness because not much impact force is applied after the deposition. Such a surface portion with low denseness is not removed by polishing to the extent of adjusting surface roughness or the like.

Therefore, even though the portion of the protective film on the outermost surface side is a portion required to have durability against plasma and the like, the portion is a film with a low denseness than that of the other portion, as a result of which performance of the film may not be ensured.

Moreover, as a surface portion of the protective film is continued to be removed by etching and the like during use of apparatus with a structural member, a denseness of the surface of the protective film gradually changes accompanying the removal. For example, in a semiconductor manufacturing apparatus, when conditions of an inner surface of a chamber (i.e., the protective film) changes, the amount of process gas consumed may change and the like, resulting in a problem such as unstable manufacturing quality.

Similarly, in a protective film formed for the purpose of improving wear resistance, when a surface denseness changes accompanying wear, a problem such as gradual change in sliding resistance can occur. Thus, the conventional protective film formed by an aerosol deposition method or the like may not be able to stably maintain its performance over a long period of time.

The present invention was made in view of these problems, and an object of the present invention is to provide a structural member capable of stably maintaining performance of a protective film over a long period of time, and a method for producing the same.

SUMMARY OF THE INVENTION

In order to solve the above problem, the structural member according to the present invention includes a base material and a protective film formed by depositing a material while applying an impact force to a surface of the base material. Provided that an index indicating a degree of a local denseness of the protective film is defined as a denseness index, the value of the denseness index at a first portion that is a portion of the protective film including an outer surface thereof is 50% or more of the value of the denseness index at a second portion that is a portion of the protective film closer to a base material side thereof than the first portion.

In such a structural member, the denseness index of the first portion of the protective film, including an outer surface thereof, is as high as that of the second portion on a base material side, as a result of which sufficient performance can be achieved from the beginning. As a difference between the value of the denseness index of the first portion and the value of the denseness index of the second portion inside the first portion is relatively small, performance of the protective film does not significantly change even though a surface side of the protective film is removed by etching or the like. Therefore, the performance of the protective film can be stably maintained over a long period of time.

In order to solve the aforementioned problem, the method for producing a structural member according to the present invention includes a step of providing a base material, a step of depositing a material while applying an impact force to a surface of the base material to form a protective film, and a step of removing a surface portion of the protective film until, provided that an index indicating a degree of a local denseness of the protective film is defined as a denseness index, a value of the denseness index at a first portion that is a portion of the protective film including an outer surface thereof is 50% or more of a value of the denseness index at a second portion that is a portion of the protective film closer to the base material side thereof than the first portion.

Preliminarily removing a surface portion of the protective film, having a low denseness, allows the denseness index at the first portion on the surface side to be kept high. As a difference in the value of the denseness index between the first portion and the second portion is relatively small, performance of the protective film can be stably maintained over a long period of time as described above.

According to the present invention, it is possible to provide a structural member capable of stably maintaining performance of a protective film over a long period of time, and a method for producing the same.

DETAILED DESCRIPTION OF THE PREFERRED EMBODIMENT

The present embodiment will be described by referring to the attached drawings. In order to facilitate understanding of the description, an identical constituent is indicated with the same sign as far as possible in each drawing, and duplicated explanations will be omitted.

A structural member 10 according to the present embodiment is used as a member constituting an inner wall of a processing chamber in a semiconductor manufacturing apparatus (not shown), for example, such as a plasma etching apparatus. Note, however, that the application of such structural member 10 is only an example, and should not be limited for the semiconductor manufacturing apparatus.

Figure 1:
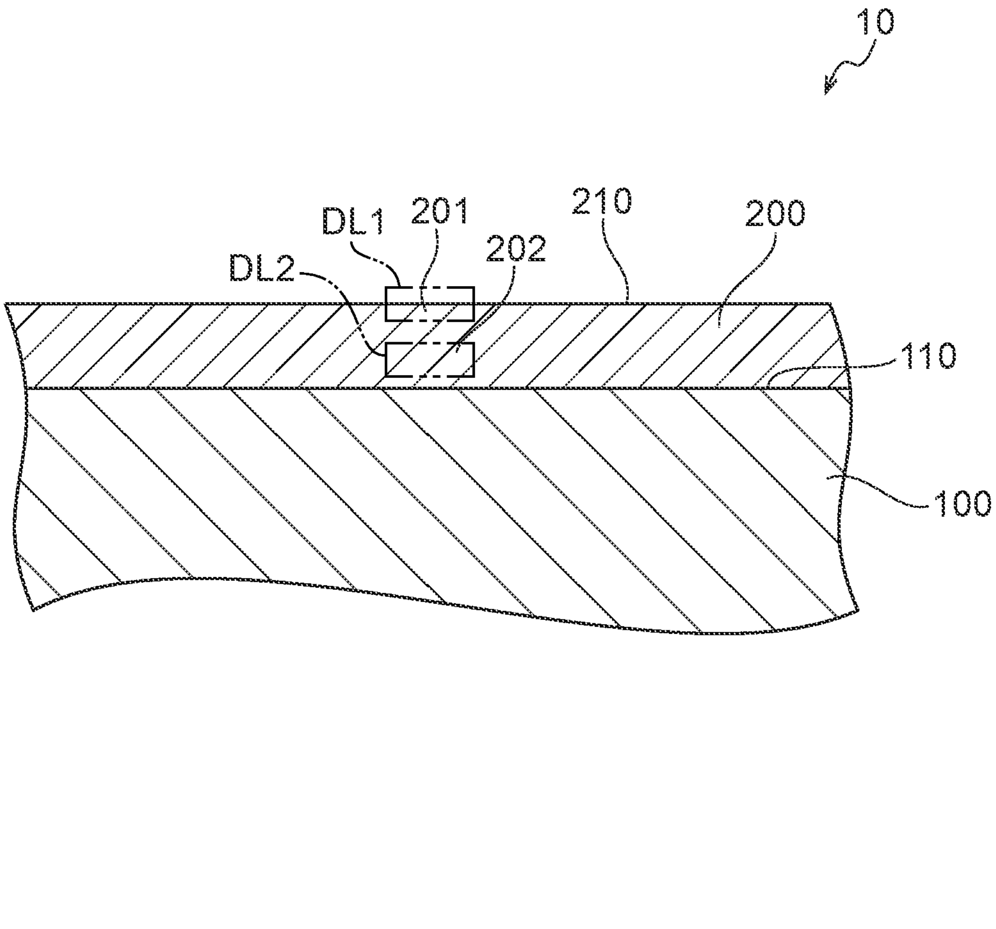
FIG. 1 shows a schematical diagram of a cross-section of the structural member according to the present embodiment.

As shown in FIG. 1, the structural member 10 has a base material 100 and a protective film 200 formed so as to cover a surface 110 of the base material 100. In a plasma etching apparatus, a surface 210 of the protective film 200 is exposed toward a space in the chamber. The protective film 200 of the present embodiment is arranged for the purpose of protecting the base material 100 from plasma.

The base material 100 is a member that mostly occupies the entire structural member 10. In the present embodiment, the base material 100 is composed of a sintered ceramic body containing high-purity aluminum oxide ($Al_2O_3$). The base material 100 may be a sintered ceramic body made of a material different from the above material, and may be metal depending on applications of the structural member 10.

The protective film 200 is a film formed so as to cover the surface 110 of the base material 100 as described above. In the present embodiment, the protective film 200 is composed of a film containing polycrystalline yttria ($Y_2O_3$). The protective film 200 may be a ceramic film made of a different material from the above material.

The protective film 200 according to the present embodiment is formed on the surface 110 of the base material 100 after calcination by using an aerosol deposition method. As is well known, in the aerosol deposition method, microparticles that are materials for the protective film 200, are dispersed in gas to form an "aerosol," which is then injected and brought into collision toward the surface 110. On the surface 110, by the impact of collision, deformation and crushing of microparticles result, thereby allowing the microparticles to be gradually deposited as the protective film 200 while bonded to each other. In this manner, the protective film 200 is a film formed by depositing a material while applying impact force to the surface 110 of the base material 100.

A portion surrounded by a dotted line DL1 in FIG. 1, is a portion of the protective film 200 including an outer surface 210 thereof. The corresponding portion is also hereinafter denoted as a "first portion 201." In the same figure, a portion surrounded by a dotted line DL2, is a portion of the protective film 200 closer to a base material 100 side than the first portion 201 of the protective film 200. The corresponding portion is hereinafter also denoted as a "second portion 202."

By the way, in a deposition method such as the aerosol deposition method where a material is deposited while applying an impact force to a surface of a base material, a denseness of a protective film is not uniform in a depth direction, and the denseness tends to significantly decrease at an outer surface portion. This is considered to be because a denseness of a portion of the protective film on a base material side thereof increases due to repeated impact forces applied after deposition, while the outermost surface portion of the protective film does not undergo much application of impact force after deposition. The surface of the protective film may be removed by polishing after the deposition, however, the polishing is carried out in order to adjust surface roughness, resulting in that the amount removed is small, and a surface portion with a low denseness also remains after the polishing.

In contrast, the structural member 10 according to the present embodiment is produced by the method described below, whereby a denseness of the protective film 200 is generally uniform in a depth direction.

Herein, an index denoted as a numerical value, which is a degree of a local denseness of the protective film 200 is hereinafter also referred to as a "denseness index." The denser some portion of the protective film 200 becomes, the larger the value of the denseness index of the portion becomes. Various indices (physical quantities and the like) can be used as such denseness indices, however, the indentation hardness measured for each portion of the protective film 200 will be used as the "denseness index" in the following description.

The indentation hardness can be measured, for example, by carrying out a micro indentation hardness test (nanoindentation) on a surface of a portion to be measured of the protective film 200. For example, an indenter used in the test is a Berkovich indenter, an indentation depth is set to be a fixed value of 200 nm, and then indentation hardness HIT may be measured. As a surface location to be measured for HIT, a surface excluding scratches and concave portions is preferably selected. A smooth surface subjected to polishing may be more preferably an object for measurement. The number of measurement points may be at least 25 points or more, and an average value of HIT values of 25 or more points measured may be hardness in the present invention. Other test methods and analysis methods, procedures for verifying performance of the test apparatus, and conditions required for standard reference samples may employ those in accordance with ISO 14577.

As will be described below, the protective film 200 is formed by forming a film on the surface 110 of the base material 100 by using the aerosol deposition method until it reaches a prescribed thickness, and then removing some portion on the surface side of the film. The graph in FIG. 2 shows a relationship between each position in a depth direction (horizontal axis) and the value of the denseness index of the protective film 200 at each position (vertical axis), at a time immediately after completion of deposition by the aerosol deposition method (i.e., before removal of some portion on the surface side).

Figure 2:
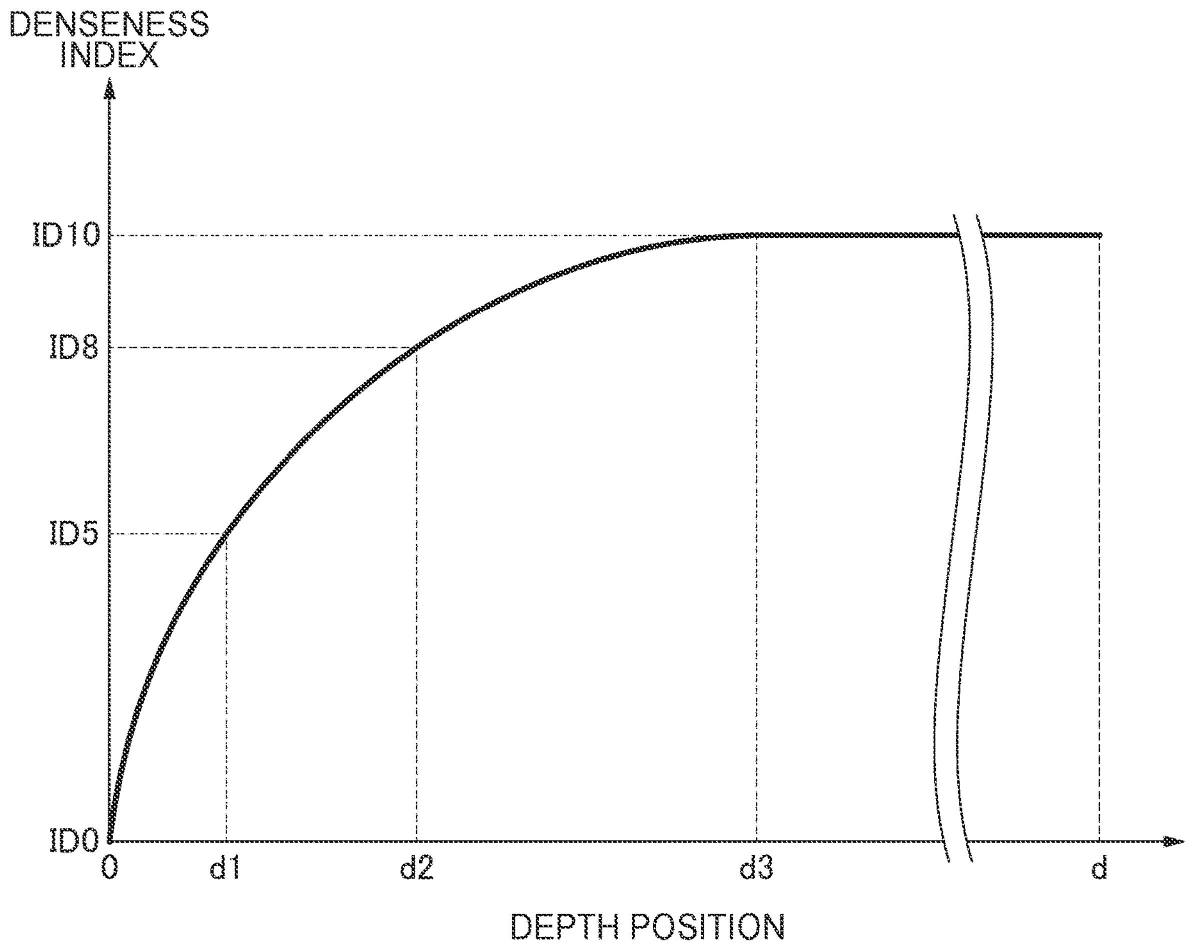
FIG. 2 shows the value of a denseness index in each portion of a protective film.

The number "0" on the horizontal axis in FIG. 2 represents a position of the outermost surface of the protective film 200 immediately after deposition. The value of the denseness index (indentation hardness) of the protective film 200 at this position is ID0 that is the smallest value in the entire protective film 200.

The word "d" on the horizontal axis of FIG. 2 represents a position of the protective film 200 closest to the base material 100 side thereof, immediately after deposition. The value of the denseness index of the protective film 200 at this position is ID10 that is the highest value in the entire protective film 200.

When a position of the protective film 200 moves from a surface of the protective film 200 to a position of d1 that is further (base material 100 side) from the surface, the value of the denseness index at this position of the protective film 200 increases to an ID5. ID5 is 50% of the value of ID10. When a position of the protective film 200 reaches a position of d2 that is further from d1, the value of the denseness index at this position of the protective film 200 rises to an ID8. ID8 is 80% of ID10. When a position of the protective film 200 reaches to a position of d3 that is further from d2, the value of the denseness index at this position of the protective film 200 rises to ID10. In the range from the position of d3 of the protective film 200 to the position of d thereof, the value of the denseness index is generally constant (ID 10) regardless of the position.

As described above, in the protective film 200 immediately after deposition, the denseness index of the surface becomes an extremely small value. The value of the denseness index gradually increases as the position of the protective film 200 moves from the surface to the further side, and at a deeper position than the position of d3, the value of the denseness index is generally constant (ID 10).

Then, in the present embodiment, after completion of deposition of the protective film 200, some portion of a surface of the protective film 200 is removed by polishing or the like, making it possible for the denseness index at a newly formed surface portion to be higher. In other words, some portion of the surface of the protective film 200 is decided to be removed until the value of the denseness index at the surface 210 of the protective film 200 is sufficiently high.

For example, removal of surface of the protective film 200 to the depth position of d1 in FIG. 2, allows the value of the denseness index at the final surface 210 to be 50% (ID5) of the value of the denseness index at a portion sufficiently further from the surface 210 (ID10). Further removal of surface of the protective film 200 can further increase the value of the denseness index at surface 210. In any case, the amount of removal of surface of the protective film 200 is sufficiently larger than the amount of removal aiming for adjusting surface roughness. The "portion sufficiently further from the surface 210" as described above, i.e., the minimum depth position such that the value of the denseness index is generally a constant value (ID 10), may be an interface position of the protective film 200 on a base material 10 side thereof, or may be a position in front thereof (the surface 210 side).

In the present embodiment, as a result of having removed the surface of the protective film 200 in such a manner, the value of the denseness index at the first portion 201 in FIG. 1 is 50% or more of the value of the denseness index at the second portion 202. As the value of the denseness index of the first portion 201 of the protective film 200, including the outer surface 210 thereof, is as high as that of the second portion 202, the structural member 10 can demonstrate sufficient performance from the beginning when it is used in a semiconductor manufacturing apparatus and the like.

As the difference between the value of the denseness index of the first portion 201 and the value of the denseness index of the second portion 202 inside the first portion 201, is relatively small, the performance of the protective film 200 does not change significantly even though a surface side of the protective film 200 is removed by etching or the like. Therefore, the performance of the protective film 200 can be stably maintained over a long period of time.

The value of the denseness index at the first portion 201 is preferably 50% or more, as in the present embodiment, but it may be further preferably 80% or more or 90% or more. The amount of removal of the surface of the protective film 200 can be adjusted according to a desired denseness index value.

As shown in FIG. 2, in the present embodiment, the value of the denseness index in each portion of the protective film 200 gradually increases from the surface 210 side to the base material 100 side. Such a change in the value of the denseness index may be a smooth change or a gradual change. In some portion, the value of the denseness index may also change in an opposite direction to the above described. For example, the value of the denseness index in the vicinity of an interface of the protective film 200, closer to the base material 100 side thereof than the second portion, may be smaller than the denseness index of the second portion.

FIG. 2 shows a schematic diagram of a relationship between a depth position and the denseness index, in the protective film 200. It has been confirmed that the relationship between the two is generally as shown in FIG. 2, regardless of a material of the protective film 200 or a type of parameter selected as the denseness index or the like. A specific measurement example of such a relationship will be shown below.

The present inventors have prepared a sample of the structural member 10 by using alumina (Al2O3) as a material of the base material 100 and yttria (Y2O3) as a material of the protective film 200. The protective film 200 underwent deposition by the aerosol deposition method. A thickness of the protective film 200 immediately after completion of the deposition was 10.5 μm.

As the denseness index, indentation hardness at each portion of the protective film 200 was used. Immediately after completion of deposition of the protective film 200 and before removal of a surface thereof, the indentation hardness at the surface was measured to be 2.6 GPa. In other words, in this sample of the structural member 10, the denseness index at the depth position "0" in FIG. 2, i.e., the value of ID0, was confirmed to be 2.6 GPa.

Thereafter, the removal of the surface of the protective film 200 and the measurement of indentation hardness at a newly formed surface after the removal were repeated.

After the amount of removal from a surface after deposition (i.e., the first surface) reached 1.25 μm, the indentation hardness at a surface after the removal was measured to be 10.5 GPa. Then, after the amount of removal from the surface after deposition reached 2.0 μm, the indentation hardness on a surface after removal was measured to be 10.8 GPa. Thereafter, even after further removal of the surface of the protective film 200, the indentation hardness at a surface after removal was confirmed to be almost unchanged from 10.8 GPa. In other words, in this sample of the structural member 10, the depth position that slightly exceeded "d3" in FIG. 2 was generally 2 μm, and the denseness index at that position, i.e., the value of ID 10, was confirmed to be 10.8 GPa.

In this sample of the structural member 10, the newly formed surface and a portion in the vicinity thereof when the surface after deposition has been removed only by 1.25 μm, correspond to the first portion 201 in FIG. 1. A portion at a depth position from the initial surface before removal, being 2.0 μm, corresponds to the second portion 202 in FIG. 1.

The value of the denseness index of the first portion 201 (10.5 GPa) is approximately 97% of the value of the denseness index of the second portion 202 (10.8 GPa). Thus, in the above sample, when the surface of the protective film 200 after deposition is removed by 1.25 μm or more, a difference in the value of the denseness index between the first portion 201 and the second portion 202 becomes extremely small, confirming that the performance of the protective film 200 can be stably maintained for a long period of time.

Figure 3A:
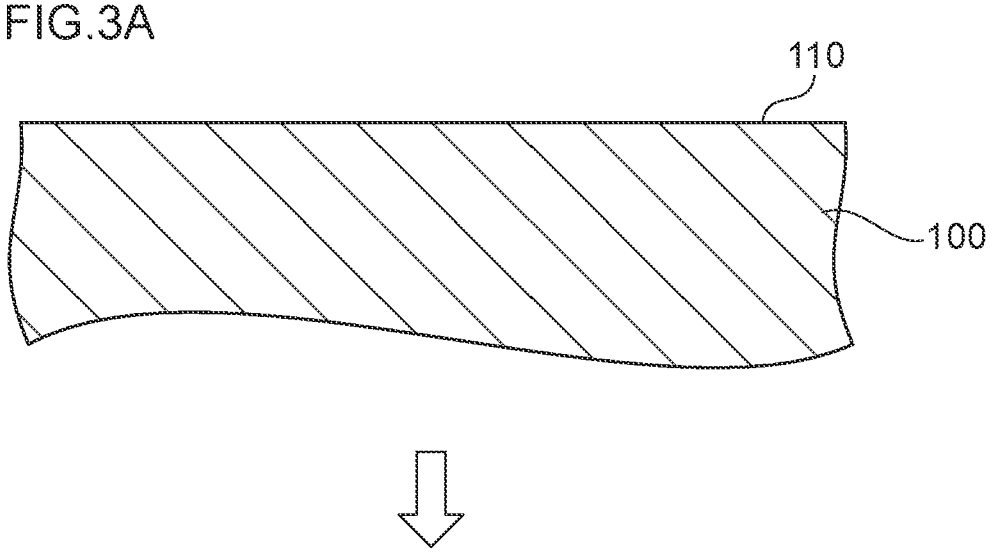
FIG. 3A shows a diagram for explaining the method for producing a structural member according to the present embodiment.

The method for producing the structural member 10 will be described with reference to FIG. 3A, FIG. 3B, and FIG. 3C. As shown in FIG. 3A, first, the base material 100 is provided. It is preferable that the surface 110 of the base material 100 has been preliminarily regulated for surface roughness thereof, and the like to the extent that the protective film 200 can be stably formed thereafter.

Figure 3B:
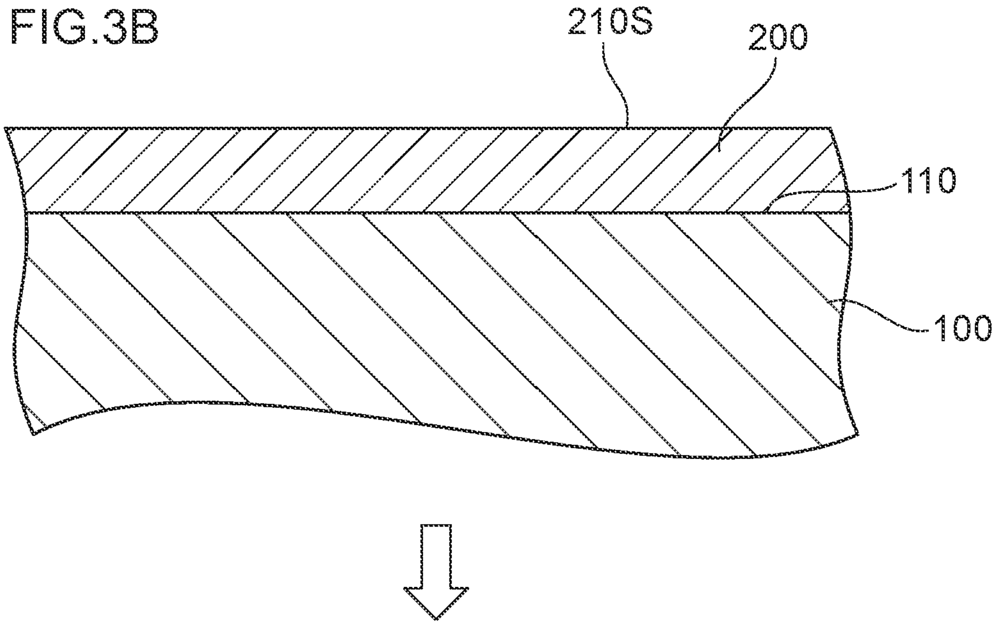
FIG. 3B shows a diagram for explaining the method for producing a structural member according to the present embodiment.

Subsequently, as shown in FIG. 3B, the protective film 200 is formed by depositing a material while applying an impact force to the surface 110 of the base material 100. For a deposition method, the aerosol deposition method may be used, as in the present embodiment; however, other methods such as ion-assisted vapor deposition may be employed. Regardless of either method is used for deposition, the values of the denseness indices in each portion of the formed protective film 200 have the same distribution as that shown in FIG. 2. In FIG. 3B, the surface of the protective film 200 at a time of completion of deposition is marked with the sign "210S".

Figure 3C:
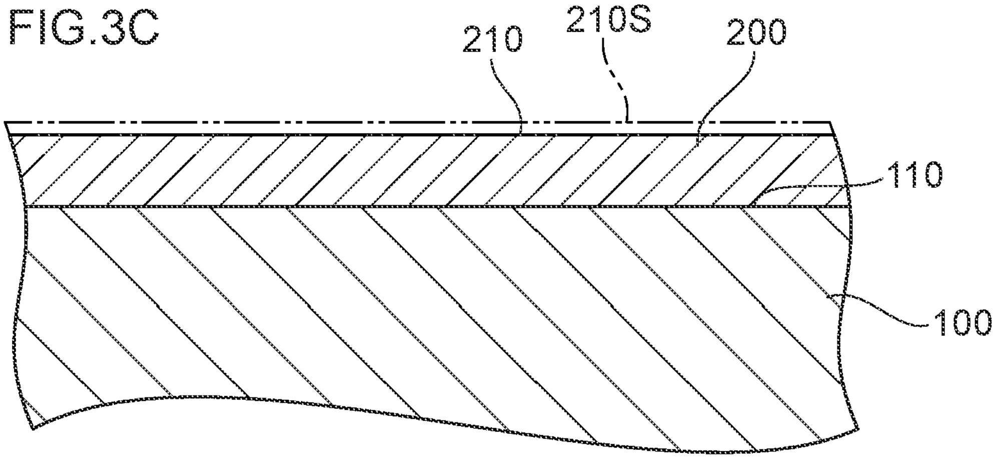
FIG. 3C shows a diagram for explaining the method for producing a structural member according to the present embodiment.

Subsequently, as shown in FIG. 3C, the surface portion of the protective film 200 is then removed. Here, until the value of the denseness index at the first portion 201 of FIG. 1 becomes 50% or more of the value of the denseness index at the second portion 202 in the same figure, a portion of the protective film 200, including a surface 210S thereof is removed. This step may be carried out while measuring the value of the denseness index at the surface of the protective film 200 each time, or a depth to which the surface should be removed may be preliminarily determined by experiment or the like.

Removal of the surface 210S of the protective film 200 may be carried out by mechanical grinding, polishing, or the like, or may be carried out by dry etching, wet etching, or the like. Surface roughness of the surface 210 may be then adjusted or the like, if necessary.

The protective film 200 may be arranged for the purpose of protecting the base material 100 from plasma, as in the present embodiment, or it may be arranged, aiming at adding other functions to the base material 100. For example, the film may be that for improving wear resistance of the base material 100.

In the present embodiment, the indentation hardness was used as the denseness index, however, as described before, various indices can be used as denseness indices. For example, any of a crystallite size, porosity, fluorine content, a 3D roughness parameter, an acid etching amount, a plasma etching amount, hydrogen content, Raman, intensity of XPS, a residual stress, light transmission or a reflectance, a thermal diffusivity, and the like, of the protective film 200 or indices that correlate therewith, can be used as the denseness indices. When any of the above indices is used as the denseness index, it is possible to draw a graph similar to that shown in FIG. 2.

Measurement methods and the like for each of the indices are exemplified below, but regardless of which index is used as the denseness index, a first portion of the protective film 200 including the surface 210 thereof, and a second portion that is a portion closer to the base material 100 side than the first portion may be measured, respectively, under the same conditions and by the same measurement method as much as possible. As a result, if the value of the denseness index at the first portion is 50% or more, preferably 80% or more, of the value of the denseness index at the second portion, the effect described above can be achieved. Note, however, that each of the following measurement conditions and the like, has been confirmed to be suitable at least in a case in which the protective film 200 undergoes deposition by the aerosol deposition method.

<Crystallite size> A parameter such that the smaller the crystallite in the protective film 200 is, the larger the value of the parameter becomes, can be used as the value of the denseness index. As such a parameter, for example, a reciprocal of the average crystallite size measured as follows can be used. For example, the "average crystallite size" described above is a value obtained by photographing a transmission electron microscope (TEM) image at a magnification of 400,000 times or more and calculating an average value of diameters of 15 approximately-circular crystallites in the mage. In this case, a sample thickness made sufficiently thin (about 30 nm) upon focused ion beam (FIB) processing, thereby enabling identification of crystallite more clearly. It is preferable that the magnification of image is appropriately selected in a range of 400,000 times or more. In an example of the protective film 200 formed by the aerosol deposition method, a crystallite size of the first portion is preferably smaller than 20 nm in the case of a crystallite size of the second portion being 10 nm.

<Porosity> A parameter such that the smaller the occupancy of pores (i.e., porosity) in a cross-section of the protective film 200 is when cut, the larger the value of the parameter becomes, can be used as the value of the denseness index. As such a parameter, for example, a value obtained by subtracting the porosity measured as follows from 100(%), can be used. In measuring the porosity, for example, a cross-section of the protective film 200 is observed using a scanning electron microscope (S4100, manufactured by Hitachi, Ltd.) followed by digitalization of the resulting image. Then, by using image processing software (Image-Pro PLUS manufactured by Media Cybernetics, Inc.), an area occupied by pores in a fixed area of an observation field of view is measured and calculated in terms of an area percentage. In a case in which a porosity value obtained in this manner is, for example, 10%, the denseness index is calculated as 90%.

<Fluorine content> A parameter such that the smaller the fluorine content in the protective film 200 is, the larger the value of the parameter becomes, can be used as the value of the denseness index. As such a parameter, for example, a reciprocal of the integrated value of the fluorine content that is measured as follows, can be used. First, a portion to be measured of the protective film 200 is exposed, and a surface of the portion is subjected to exposure to plasma under constant conditions. Then, when the surface is etched, an integrated value of the fluorine content detected within a predetermined time is calculated. Upon exposure to plasma, for example, an inductively coupled plasma reactive ion etching apparatus (MUC-21 RV-APS-SE manufactured by Sumitomo Precision Products, Co., Ltd.) can be used. In this case, while an SF6 gas is supplied at a constant flow rate (for example, 100 sccm) to a circumference of the protective film 200, pressure may be maintained at 0.5 Pa. A plasma output may be set to Coil/Bias=1500/0 (W). A measurement of the fluorine content upon etching can be carried out by using an XPS apparatus, K-Alpha manufactured by Thermo Fisher Scientific Inc. Argon ions may be used as an etching source, and a time for detection may be set to 145 seconds. In this case, the fluorine content may be measured every 5 seconds followed by integration of the obtained values.

<3D roughness parameter> A portion to be measured of the protective film 200 is exposed, and a surface of the portion is irradiated with plasma under predetermined conditions. Surface roughness of the surface is then measured. A parameter such that the smaller the surface roughness obtained in this manner is, the larger the value of the parameter becomes, can be used as the value of the denseness index. As such a parameter, for example, a reciprocal of the "arithmetic mean height Sa" described in paragraph 0035 of Japanese Patent Laid-Open No. 2020-012192 can be used.

<Acid etching amount> A portion to be measured of the protective film 200 is exposed, and a surface of the portion is under an exposure to hydrochloric acid under constant conditions. In this case, a parameter such that the larger the dimension (acid etching amount) in a depth direction of an etched portion of the protective film 200 is, the larger the value of the parameter becomes, can be used as the value of the denseness index. As such a parameter, for example, a reciprocal of the acid etching amount measured as described above can be used. As the "constant conditions" described above, for example, the conditions of room temperature of 19.2° C., a hydrochloric acid concentration of 5.7% (1.6 N), a temperature of hydrochloric acid of 16.8±0.1° C., and a time of exposure to hydrochloric acid of any of 1, 3, 7, 15, or 30 minutes, can be employed. The temperature of hydrochloric acid can be measured each time before etching processing by using AD-6525 manufactured by A&D Company, Limited as a thermometer.

<Plasma etching amount> Instead of etching using the acid as described above, etching using plasma may be employed. In other words, a parameter such that the larger the etching amount when a portion to be measured of the protective film 200 is exposed and a surface of the portion is under an exposure of plasma under constant conditions is, the larger the value of the parameter becomes, can be used as the value of the denseness index. As such a parameter, for example, a reciprocal of the etching amount measured as described above can be used. As an apparatus for exposing the protective film 200 to plasma, for example, an inductively coupled plasma reactive ion etching apparatus (MUC-21 RV-APS-SE manufactured by Sumitomo Precision Products Co., Ltd.) can be used. As for the "constant conditions" described above, while an SF6 gas is supplied at a constant flow rate (for example, 100 sccm) to a circumference of the protective film 200, pressure may be maintained at 0.5 Pa. A plasma output may be set to Coil/Bias=1500/750 (W). An exposure time to plasma may be 60 minutes. For measurement of etching volume, for example, a laser microscope (VHX-1100 manufactured by KEYENCE CORPORATION) may be used.

<Hydrogen amount> A parameter such that the smaller the hydrogen amount contained in each portion of the protective film 200 is, the larger the value of the parameter becomes, can be used as the value of the denseness index. As such a parameter, for example, a reciprocal of the hydrogen amount measured can be used. As a method for measuring the hydrogen amount, the method described in paragraphs 0042 to 0053 of Japanese Patent Laid-Open No. 2020-012192 and the method described in paragraphs 0062 to 0074 of the same patent literature can be used.

<Raman> A value indicating intensity of scattered light detected by a Raman spectrometer for the protective film 200, can be used as the value of the denseness index.

<Intensity of XPS> A value indicating intensity of photoelectrons upon analysis of X-ray photoelectron spectroscopy (XPS) for the protective film 200, can be used as the value of the denseness index.

<Residual stress> A parameter such that the smaller the residual stress in each portion of the protective film 200 is, the larger the value of the parameter becomes, can be used as the value of the denseness index. The residual stress can be measured, for example, by using an X-ray residual stress measurement apparatus. Alternatively, X-ray diffraction is performed to determine a residual stress value from changes in amount of lattice plane spacing.

<Light transmittance> The value of linear transmittance of light at a surface of a portion, the portion to be measured of the protective film 200, which has been exposed, can be used as the value of the denseness index. A spectrophotometer is used for the measurement, and a wavelength of light may be 200 to 800 nm.

<Reflectance of light> A parameter such that the smaller the reflectance of light at a surface of a portion, the portion to be measured of the protective film 200, which has been exposed, is, the larger the value of the parameter becomes, can be used as the value of the denseness index. A spectrophotometer is used for the measurement, and a wavelength of light may be 200 to 800 nm.

<Thermal diffusivity> The value of thermal diffusivity of the protective film 200 when local heating is instantaneously carried out therefor with a pulsed laser or the like, can be used as the value of the denseness index. For measurement of the thermal diffusivity, for example, a laser flash method or a pulsed light heating thermo-reflectance method, and the like can be employed.

So far, the present embodiments have been described with reference to specific examples. However, the present disclosure is not limited to these specific examples. Design changes appropriately made to these specific examples by those skilled in the art are also included in the scope of the present disclosure as long as they include the features of the present disclosure. Each element included in each of the aforementioned specific examples, as well as their arrangement, conditions, shapes, and the like, are not limited to those exemplified, and can be appropriately changed. Each element included in each of the aforementioned specific examples can be appropriately combined as long as no technical inconsistency thereof results.

What is claimed is:

1. A structural member comprising a base material and a protective film formed by an aerosol deposition method on a surface of the base material, wherein, provided that an index indicating a degree of a local denseness of the protective film is defined as a denseness index, a value of the denseness index at a first portion that is a portion of the protective film including an outer surface thereof and not including an interface on the base material side is 50% or more of a value of the denseness index at a second portion that is a portion of the protective film including the interface on the base material side and not including the first portion.

2. The structural member according to claim 1, wherein the denseness index is indentation hardness.

* * * * *